US008982065B2

(12) United States Patent
Yu

(10) Patent No.: US 8,982,065 B2
(45) Date of Patent: Mar. 17, 2015

(54) METHOD AND APPARATUS FOR PERFORMING PROCESSES IN A USER EQUIPMENT BY USING TOUCH PATTERNS

(75) Inventor: Dong-Won Yu, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 157 days.

(21) Appl. No.: 13/245,946

(22) Filed: Sep. 27, 2011

(65) Prior Publication Data

US 2012/0169632 A1 Jul. 5, 2012

(30) Foreign Application Priority Data

Dec. 31, 2010 (KR) ........................ 10-2010-0140680

(51) Int. Cl.
*G06F 3/041* (2006.01)
*G06F 3/0488* (2013.01)

(52) U.S. Cl.
CPC ........ *G06F 3/04883* (2013.01); *G06F 3/04886* (2013.01)
USPC ....................................................... 345/173

(58) Field of Classification Search
None
See application file for complete search history.

(56) References Cited

U.S. PATENT DOCUMENTS

| 7,593,000 | B1 * | 9/2009 | Chin | 345/156 |
|---|---|---|---|---|
| 7,702,130 | B2 | 4/2010 | Im et al. | |
| 2006/0026536 | A1 * | 2/2006 | Hotelling et al. | 715/863 |
| 2008/0036743 | A1 * | 2/2008 | Westerman et al. | 345/173 |
| 2011/0115721 | A1 * | 5/2011 | Li et al. | 345/173 |

FOREIGN PATENT DOCUMENTS

| KR | 10-2006-0070280 A | 6/2006 |
|---|---|---|
| KR | 10-2010-0010980 A | 2/2010 |

* cited by examiner

*Primary Examiner* — Nicholas Lee
(74) *Attorney, Agent, or Firm* — IP Legal Services, LLC

(57) ABSTRACT

A method and apparatus for performing processes in a user equipment by using touch patterns. A touch pattern may be received through a touch input unit of the user equipment. A memory of the user equipment may be searched for a touch pattern data corresponding to the received touch pattern. The touch pattern data may be loaded from the memory, and the operation that corresponds to the received touch pattern may be performed based on the loaded touch pattern data. The touch pattern data may include at least one of a touch pattern field for storing information on the received touch pattern, an application information field for storing information on the operation to be performed in response to the received touch pattern, and a touch pattern input area information field for storing information on a touch pattern input area of the received touch pattern.

20 Claims, 6 Drawing Sheets

| Field 1 | Field 2 | Field 3 | Field 4 | Field 5 | Field 6 | Field 7 |
|---|---|---|---|---|---|---|
| Pattern V | Com.google.map | latitude | longitude | address | memo | Album |
| Pattern X | Com.kt.alleh-navi | Home location information | Company location information | Other location information | map | Internet |
| Pattern O | Com.app.camera | Auto focus value | White balance value | Brightness value | Album | Camcorder | ance with an embodiment of the present invention relate to a user interface of a user equipment including a touch input unit, and more particularly, to performing processes in a user equipment by using touch patterns.

METHOD AND APPARATUS FOR PERFORMING PROCESSES IN A USER EQUIPMENT BY USING TOUCH PATTERNS

CROSS REFERENCE TO PRIOR APPLICATIONS

The present application claims priority under 35 U.S.C. §119 to Korean Patent Application No. 10-2010-0140680 (filed on Dec. 31, 2010), which is hereby incorporated by reference in its entirety.

FIELD OF THE INVENTION

Apparatuses and methods consistent with the present invention relate to a user interface of a user equipment including a touch input unit, and more particularly, to performing processes in a user equipment by using touch patterns.

BACKGROUND OF THE INVENTION

A user equipment has been advanced to perform multiple functions such as communicating with others, exchanging personal information, accessing Internet banking, and electronic payments as well as capturing images, playback of music/video files, playing games, receiving a broadcasting signal, and storing personal information. Lately, such a multifunctional user equipment has been receiving greater attention.

In order to implement such various functionalities in a single user equipment, many studies have been made for developing various user interfaces in hardware and software for interacting with inputs from users. For example, a user equipment generally includes a touch screen having both an input function and a display function. Such a user equipment employs a touch user interface (UI) for receiving touch inputs from a user and displaying information that a user wants.

There is a need for developing a user interface that enables a user to conveniently and quickly execute programs, applications, or processes of a user equipment by using a touch user interface such as a touch screen.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a user may conveniently and quickly execute and/or control programs, applications, and/or processes of a user equipment by using a touch pattern previously stored in the user equipment.

In accordance with an embodiment of the present invention, a touch pattern may be received through a touch input unit of a user equipment. A memory of the user equipment may be searched for a touch pattern data corresponding to the received touch pattern. The touch pattern data may be loaded from the memory, and the operation that corresponds to the received touch pattern may be performed based on the loaded touch pattern data.

In accordance with an embodiment of the present invention, the touch pattern data may include at least one of a touch pattern field for storing information on the received touch pattern, an application information field for storing information on the operation to be performed in response to the received touch pattern, and a touch pattern input area information field for storing information on a touch pattern input area of the received touch pattern.

In accordance with an embodiment of the present invention, the touch pattern input area may include an area of the touch input unit where the touch pattern is input on an application screen associated with the operation.

In accordance with an embodiment of the present invention, the touch pattern data may further include a field for storing information on functions of the user equipment which are interactive with the operation to be performed in response to the received touch pattern.

In accordance with an embodiment of the present invention, a touch pattern input area may be displayed where the touch pattern is input on an application screen associated with the operation.

In accordance with an embodiment of the present invention, prior to receiving the touch pattern, an initial touch pattern input may be received on an application screen associated with the operation while executing the operation. Information on the operation and information on a touch pattern input area of the operation may be stored into the memory as the touch pattern data.

In accordance with an embodiment of the present invention, prior to receiving the touch pattern, a determination may be made as to whether or not the received initial touch pattern matches a corresponding touch pattern data that is already stored in the memory. When the corresponding touch pattern data matching the received initial touch pattern is already stored in the memory, one of replacing the stored touch pattern data corresponding to the received initial touch pattern with an updated touch pattern data and requesting an input of a different touch pattern as the initial touch pattern may be selectively performed.

In accordance with an embodiment of the present invention, prior to the receiving the touch pattern, an initial touch pattern input may be received on a waiting screen. Selection of the operation to be performed may be requested in response to receiving the touch pattern. The memory may store information on the initial touch pattern and information on the selected operation.

In accordance with another embodiment of the present invention, an apparatus for performing an operation may include a touch input unit, a controller, and a memory. The touch input unit may receive a touch pattern as an input. The controller may enable the touch input unit to receive the touch pattern, initiate a search for a touch pattern data corresponding to the received touch pattern, initiate a loading of the touch pattern data, and initiate performance of the operation that corresponds to the received touch pattern, based on the loaded touch pattern data. The memory may store the touch pattern data and from which the touch pattern data is searched for and loaded.

In accordance with another embodiment of the present invention, the touch pattern data may include at least one of a touch pattern field for storing information on the received touch pattern, an application information field for storing information on the operation to be performed in response to the received touch pattern, and a touch pattern input area information field for storing information on a touch pattern input area of the received touch pattern. The touch pattern input area may include an area of the touch input unit where the touch pattern is input on an application screen associated with the operation.

In accordance with another embodiment of the present invention, the touch pattern data may further include a field for storing information on functions which are interactive with the operation to be performed in response to the received touch pattern.

In accordance with another embodiment of the present invention, a touch pattern input area may be displayed on a display module configured with the touch input unit. The touch pattern input area may be an area where the touch pattern is input on an application screen associated with the operation.

In accordance with another embodiment of the present invention, the controller may further enable the touch input unit to receive an initial touch pattern input on an application screen associated with the operation while executing the operation, and enable the memory to store, as the touch pattern data, information on the operation and information on a touch pattern input area of the operation.

In accordance with another embodiment of the present invention, the touch pattern input area may include an area of the touch input unit where the touch pattern is input on an application screen associated with the operation. The touch pattern data may further include a field for storing information on functions of the user equipment which are interactive with the operation.

In accordance with another embodiment of the present invention, a determination may be made as to whether or not the received initial touch pattern matches a corresponding touch pattern data that is already stored in the memory. When the corresponding touch pattern data matching the received initial touch pattern is already stored in the memory, one of replacing the stored touch pattern data corresponding to the received initial touch pattern with an updated touch pattern data and requesting an input of a different touch pattern as the initial touch pattern may be selectively performed.

In accordance with another embodiment of the present invention, the controller may further enable the touch input unit to receive an initial touch pattern input on a waiting screen, a selection of the operation to be requested in response to receiving the touch pattern, and the memory to store information on the initial touch pattern and information on the selected operation.

In accordance with another embodiment of the present invention, the touch input unit may include a touch screen.

In accordance with still another embodiment of the present invention, a computer program product embodied on a computer-readable storage medium may be provided, which when executed by a computer of a user equipment, may cause the computer to perform receiving a touch pattern through a touch input unit of the user equipment, searching a memory of the user equipment for a touch pattern data corresponding to the received touch pattern, loading the touch pattern data from the memory, and performing an operation of the user equipment that corresponds to the received touch pattern based on the loaded touch pattern data.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
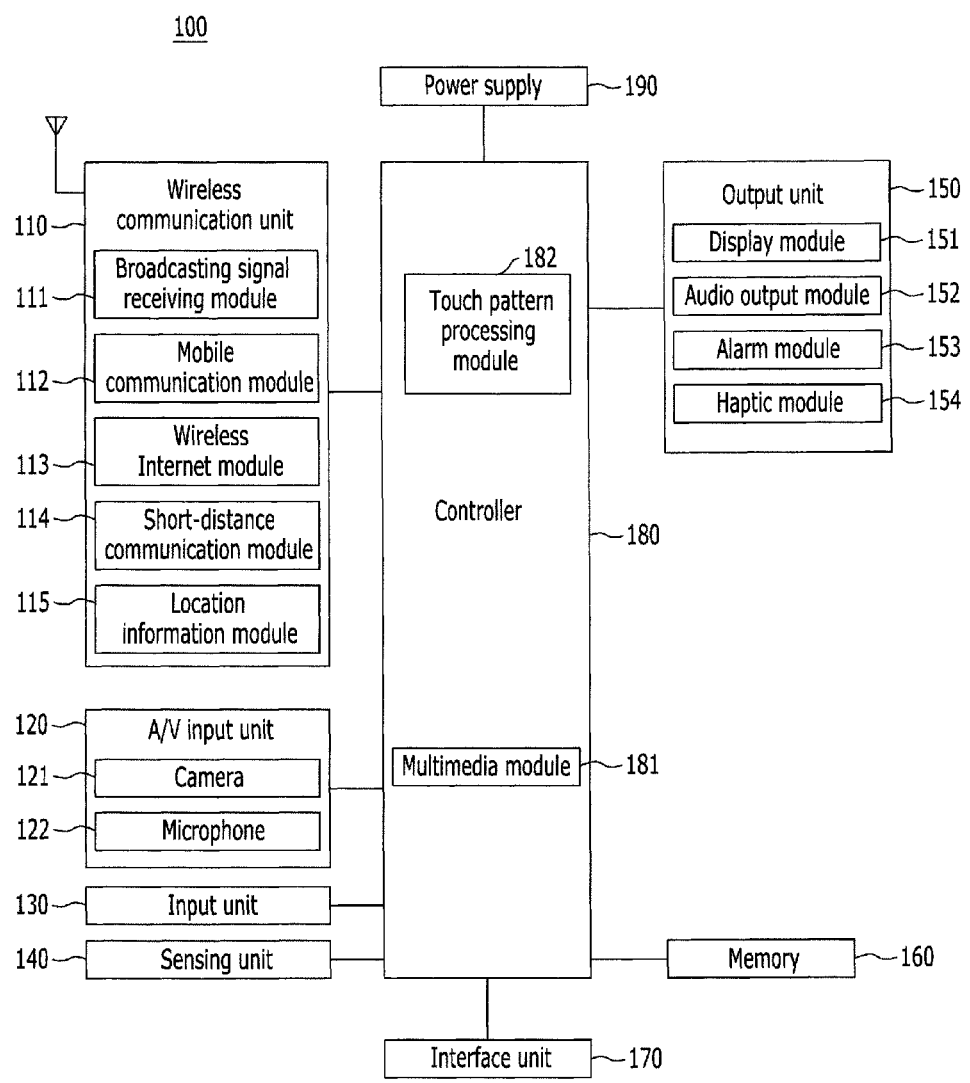
FIG. 1 illustrates a user equipment in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

Figures 2, 3:
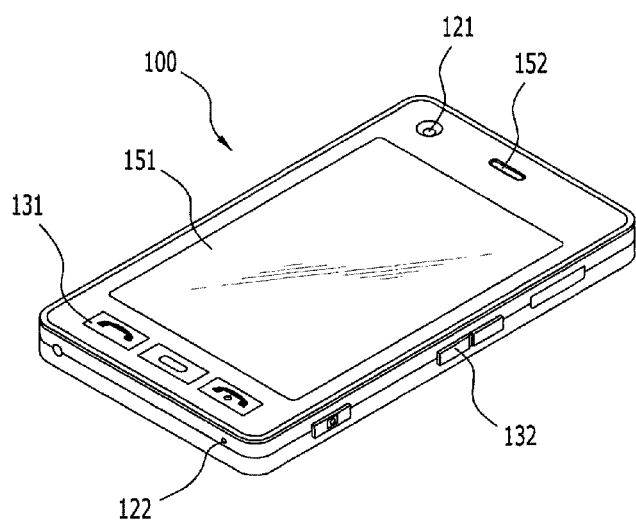
FIG. 2 illustrates an exterior view of a user equipment, in accordance with an embodiment of the present invention.
FIG. 3 illustrates a touch pattern data format in accordance with an embodiment of the present invention.

FIG. 1 illustrates a user equipment in accordance with an embodiment of the present invention, and FIG. 2 illustrates an exterior view of a user equipment in accordance with an embodiment of the present invention.

In accordance with an embodiment of the present invention, a user may input a touch pattern, such as by drawing a pattern on a specific area of an application screen which is displayed on a screen of a user equipment. The user equipment may store information related to the touch pattern as a touch pattern data. For example, the touch pattern data may include information on the touch pattern, an operation or process to be performed in response to the touch pattern, and/or a touch pattern input area. The touch pattern input area may denote an area where the touch pattern was drawn on an application screen when a touch pattern data is set up. When the user equipment receives a touch pattern identical to a stored touch pattern while displaying an application screen of a specific application or while displaying a waiting mode screen such as a home screen, a corresponding touch pattern data may be loaded and the specific application associated with the touch pattern may be performed based on the loaded touch pattern data. Furthermore, the touch pattern input area may be displayed at the specific location of the related application. Such a user equipment may include at least one of a touch input unit for inputting a touch pattern, a memory for storing touch pattern data, and a controller for processing the touch pattern and controlling operations or processes of the user equipment. Hereinafter, such a user equipment in accordance with embodiments of the present invention will be described in further detail.

Referring to FIG. 1 and FIG. 2, the user equipment 100 may include a wireless communication unit 110, an audio/video (A/V) input unit 120, an input unit 130, a sensing unit 140, an output unit 150, a memory 160, an interface unit 170, a controller 180, and a power supply 190.

The wireless communication unit 110 may include at least one module for wireless communication between the user equipment 100 and a wireless communication system or between the user equipment 100 and a network in the vicinity of the user equipment 100. For example, the wireless communication unit 110 may include any or all of a broadcasting signal receiving module 111, a mobile communication module 112, a wireless Internet module 113, a short-distance communication module 114, and a location information module 115.

The broadcasting signal receiving module 111 may receive a broadcasting signal and/or broadcasting related information from an external source such as a broadcasting management server through a broadcasting channel. The broadcasting channel may be a satellite channel or a terrestrial channel. The broadcasting management server may be a server that is provided with a broadcasting signal and/or broadcasting related information and may transmit the broadcasting signal and/or broadcasting related information to user equipments. The broadcasting signal may include any or all of a TV broadcasting signal, a radio broadcasting signal, and a data broadcasting signal. The broadcasting related information may be information related to a broadcasting channel, a broadcasting program, or a broadcasting service provider. The broadcasting related information may be provided through a mobile communication network. In accordance with an embodiment of the present invention, the broadcasting related information may be received through the mobile communication module 112. The broadcasting related information may have various types of formats. For example, the broadcasting related information may have a format of an Electronic Program Guide (EPG) of the Digital Multimedia Broadcasting (DMB) or an Electronic Service Guide (ESG) of the Digital Video Broadcast-Handheld (DVB-H).

The broadcasting signal receiving module 111 may receive a broadcasting signal from any of various broadcasting systems. For example, the broadcasting receiving module 111 may use a Digital Multimedia Broadcasting-Terrestrial (DMB-T) system, a Digital Multimedia Broadcasting-Satellite (DMB-S) system, a Media Forward Link Only (Media FLO) system, a Digital Video Broadcast-Handheld (DVB-H) system, and/or an Integrated Services Digital Broadcast-Terrestrial (ISDB-T) system. The broadcasting signal receiving module 111 may be configured to receive a broadcasting signal from other systems as well as from the above described digital broadcasting systems. The broadcasting signal receiving module 111 may store broadcasting signals and/or broadcasting related information in the memory 160.

The mobile communication module 112 may receive a wireless signal from and/or transmit a wireless signal to at least one of base stations, user equipments, and servers in a mobile communication network. The wireless signal may include data in various formats according to a type of the wireless signal, such as a voice call signal, a video call signal, a text message, and a multimedia message.

The wireless Internet module 113 may be a module for wirelessly accessing the Internet. The wireless Internet module 113 may be internally included in the user equipment 100 or externally coupled to the user equipment 100. The wireless Internet module 113 may support various types of technologies for accessing the Internet, such as Wireless Local Area Network (WLAN), Wi-Fi, Wireless broadband (WiBro), World Interoperability for Microwave Access (WiMax), and High Speed Downlink Packet Access (HSDPA), but is not limited thereto.

The short-distance communication module 114 may be a module for a short-distance communication. The short-distance communication module 114 may support related technologies, for example, Bluetooth, Radio Frequency Identification (RFID), Infrared Data Association (IrDA), Ultra Wideband (UWB), ZigBee, and Near Field Communication (NFC), but is not limited thereto.

The location information module 115 may be a module for finding a location of the user equipment 100 and providing information related to the location thereof. The location information module 115 may be a global positioning system (GPS), but is not limited thereto. For example, the location information module 115 may provide three dimensional location data of a location of the user equipment 100, such as latitude, longitude, and altitude of the user equipment 100. Such information may be calculated using various methods. For example, the location information module 115 may calculate distances from three different satellites to the user equipment 100 and times of measuring distances and calculates a location of the user equipment by applying triangulation on the calculated distances and times. For another example, the location information module 115 may calculate location and time information using three satellites and calibrate the location and time information using another satellite. The location information module 115 may constantly calculate a current location of the user equipment 100 in real-time and calculate a speed of the user equipment 100 based on the calculated locations.

The A/V input unit 120 may receive an audio signal and/or a video signal. The A/V input unit 120 may include a camera 121 and a microphone 122.

The camera 121 may process image frames of a still image or a moving image, which are captured by an image sensor in a video call mode or a photographing mode. The processed image frame may be displayed on a display module of the user equipment 100 through a display module 151 of the output unit 150. The image frames captured from the camera 121 may be stored in the memory 160 or transmitted to an external device through the wireless communication unit 110.

The microphone 122 may receive an audio signal provided externally in an on-call mode, a recording mode, or a voice recognition mode. In the case of the on-call mode, audio data may be converted to a data format that can be transmitted to a mobile communication base station through the mobile communication module 112. The microphone 122 may be implemented with various noise filtering algorithms for eliminating noise generated in the background during the receiving of the external audio signals.

The input unit 130 may be a user interface for receiving input from a user. Such an input unit 130 may be realized as various types. For example, the input unit 130 may include any of a keypad, a touch pad, a jog wheel, and/or a jog switch, but is not limited thereto. The input unit 130 may include at least one operation unit for inputting commands in order to control the operation of the user equipment 100. For example, the input unit 130 may include a call start button 131 and a volume control button 132, as illustrated in FIG. 2. Particularly, user equipments may include a touch screen as a display module in order to satisfy demands of expanding a display screen, making better use of a space, and improving design. When a user equipment employs a touch screen, the input unit 130 may be integrally realized with the display module 151. For example, the input unit 130 may be realized as a soft key type input unit on a display module of the user equipment 100.

The sensing unit 140 may detect a current status of the user equipment 100. For example, the sensing unit 140 may sense an opening or closing of a cover of the user equipment 100, a location and a bearing of the user equipment 100, acceleration and deceleration of the user equipment 100, or physical contact with or proximity to a user. Based on the detected status of the user equipment 100, the sensing unit 140 may generate a sensing signal to control the operation of the user equipment 100. For example, in the case of a mobile phone having a sliding type cover, the sensing unit 140 may sense whether a cover is opened or closed. The sensing unit 140 may sense whether or not the power supply 190 supplies power or whether or not the interface unit 170 is coupled to an external device.

The output unit 150 may generate visual outputs, audio outputs, and/or haptic outputs. The output unit 150 may include a display module 151, an audio output module 152, an alarm module 153, and a haptic module 154.

The display module 151 may output information processed by the user equipment 100. For example, in the case of an on-call mode, the display module 151 may display a user interface (UI) or a graphical user interface (GUI) according to a type of a call. In the case of a video call mode or a photographing mode, the display module 151 may display a UI or a GUI related to receive video or display captured image or video. The display module 151 may be a liquid crystal display (LCD), a thin film transistor LCD (TFT LCD), an organic light emitting diode (OLED), a flexible display, or a 3D display, but is not limited thereto. In accordance with an embodiment of the present invention, the user equipment 100 may include a plurality of display modules. For example, a plurality of display modules may be disposed on one side of the user equipment 100 with a gap between adjacent display modules or without a gap. Additionally, a plurality of display modules may be disposed on different sides of the user equipment 100.

The user equipment 100 may employ a touch screen to form the display module 151. The touch screen may have a layered structure formed of a display module and a touch sensor disposed over or under the display module. Accordingly, the display module 151 may be used not only as an output device but also as an input device when the touch screen is employed as a component of the display module 151.

The touch sensor may be in a form of a touch film, a touch sheet, or a touch pad. The touch sensor may convert pressure applied to a specific part of the display module 151 and capacitance variation formed around a specific part of the display module 151 in accordance with an electric input signal. The touch sensor may detect pressure and/or a directivity of a touch input as well as a location and/or an area of a touch input made on a touch sensor. When the touch sensor senses a touch input, the touch sensor may transmit a corresponding signal to a touch controller. The touch controller may process the signal from the touch sensor and transmit corresponding data to the controller 180. Accordingly, the controller 180 can be aware of which part of a display module has been touched.

A proximity sensor may be disposed in an internal area surrounded by the touch screen or disposed near, around, or throughout the touch screen. The proximity sensor is a sensor that may detect an object without a physical contact. For example, the proximity sensor may detect an object approaching a sensing side of the proximity sensor or detect an object located in the vicinity of the proximity sensor using an electromagnetic field or infrared rays. The proximity sensor may have a longer lifespan and higher utilization degree than that of a contact-type sensor. For example, the proximity sensor may be a through-beam photoelectric sensor, a retro-reflective photoelectric sensor, a capacitive proximity sensor, or a magnetic proximity sensor, but is not limited thereto. A capacitive touch screen may be configured to detect an approaching pointer based on electromagnetic variation that may be caused by the pointer approaching the touch screen. Such a capacitive touch screen (touch sensor) may be classified as a type of proximity sensor.

The proximity sensor may sense a proximity touch and/or a proximity touch pattern, for example, a proximity touch distance, a proximity touch direction, a proximity touch speed, a proximity touch time, a proximity touch location, and/or a proximity touch movement state. Information on proximity touch inputs or proximity touch patterns may be displayed on a touch screen.

The audio output module 152 may output audio data stored in the memory 160 or received from the wireless communication unit 110 in an on-call mode, in a recording mode, in a voice recognition mode, and/or in a broadcasting receiving mode. The audio output module 152 may output an audio signal corresponding to functions performed by the user equipment 100. For example, the audio output module 152 may output a call-signal receiving sound or a message receiving sound. Such an audio output module 152 may include a speaker.

The alarm module 153 may output a signal in order to inform a user of event generation in the user equipment 100. For example, the user equipment 100 may generate events such as call signal reception, message reception, key signal input, and/or touch input. The alarm module 153 may output various types of signals such as a video signal, an audio signal, and/or a vibration signal in order to inform a user of the event generation. The video signal and the audio signal may be output through the display module 151 and the audio output module 152 respectively. Furthermore, in accordance with an embodiment of the present invention, the user equipment 100 may include a plurality of audio output modules.

The haptic module 154 may generate various types of haptic effects that a user may sense. Particularly, the haptic module 154 may generate vibration. The haptic module 154 may control strength or pattern of vibration. For example, the haptic module 154 may output a vibration effect having different types of vibrations combined together or may output different types of vibrations sequentially. Instead of vibration, the haptic module 154 may generate various types of other effects. For example, the haptic module 154 may generate an effect that stimulates a skin of a user by controlling a pin array with each pin independently moving vertically. The haptic module 154 may generate an effect that stimulates a skin of a user by controlling an air outlet to spray out a burst of air to a user or by controlling an air inlet to intake air from around a user. Furthermore, the haptic module 154 may generate an electrostatic force, a cold sensation, or a warm sensation to stimulate a user.

The haptic module 154 may transfer a haptic effect through direct physical contact or through a muscle sense of a finger or an arm of a user. In accordance with an embodiment of the present invention, the user equipment 100 may include a plurality of haptic modules.

The memory 160 may store programs for operations of the controller 180 and input/output data. For example, the memory 160 may store various data such as contact lists, e-mails, messages, pictures, video files, various vibration patterns and effect sounds in response to a touch input made on the touch screen. In accordance with an embodiment of the present invention, any or all of touch pattern data and programs and/or applications for performing operations or processes in the user equipment by using touch patterns may be stored in the memory 160.

The memory 160 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. In accordance with an embodiment of the present invention, the user equipment 100 may interact with a web-based storage that performs the storage function of the memory 160.

The interface unit 170 may include a communication path between the user equipment 100 and an external device or devices coupled to the user equipment 100. The interface unit 170 may receive data or power from an external device, transfer the data to a constituent element of the user equipment 100 or transfer internal data of the user equipment 100 to an external device. For example, the interface unit 170 may include a wired/wireless headset port, an external power charger port, a wired/wireless data port, a memory card port, an identification module connection port, an audio I/O port, a video I/O port, and/or an earphone port. The identification module may be a chip for storing various types of information for authenticating a user right of the user equipment 100. The identification module may include a User Identify Module (UIM), a Subscriber Identity Module (SIM), and/or a Universal Subscriber Identity Module (USIM). A device having the identification module may be manufactured in the form of a smart card. Such a device may be coupled to the user equipment 100 through the identification module connection port.

The interface unit 170 may include a path for receiving power from a cradle or dock when the user equipment 100 is coupled to an external cradle or dock. The interface unit 170 may include a path for transferring command signals input to the cradle or dock by a user to the user equipment 100. A command signal or power input from the cradle or dock may operate as a signal that indicates to a user whether or not the user equipment 100 is accurately or firmly connected to the cradle or dock.

The controller 180 may control an overall operation of the user equipment 100. For example, the controller 180 may control and process a voice call, a text message, and a video call. The controller 180 may include a multimedia module 181 for reproducing multimedia data. The multimedia module 181 may be realized integrally with the controller 180 or independently from the controller 180 as an independent unit. The controller 180 may recognize a touch input made on the touch screen. For example, the controller 180 may process patterns of touch inputs made on the touch screen. Based on the processed patterns, the controller 180 may recognize a character or a symbol input through a touch screen. The controller 180 may include a touch pattern processing module 182. The touch pattern processing module 182 may initiate and/or control operations related to a setup procedure for setting up touch pattern data and a procedure for performing operations or processes in a user equipment by using touch patterns.

The touch pattern processing module 182 may receive a touch pattern from a user. The touch pattern processing module 182 may compare the received touch pattern with touch pattern data stored in the memory 160. When the received touch pattern exists in the touch pattern data stored in the memory 160, the touch pattern processing module 182 may load a touch pattern data associated with the received touch pattern and perform operations related to the touch pattern.

The power supply 190 may supply power for operating constituent elements in response to the controller 180. For example, the power supply 190 may receive power from an internal power source or from an external power source.

In accordance with an embodiment of the present invention, an apparatus may perform operations or processes of a user equipment in response to a touch pattern. The apparatus may receive the touch pattern from a user through a touch input unit, search for a touch pattern data corresponding to the touch pattern, and initiate or control operations to be performed in accordance with the touch pattern. For example, the touch pattern processing module 182 of the controller 180 may control operations of the user equipment in response to the received touch pattern. The touch input unit may be provided with the display module 151 and be integrally formed of an input device and an output device. The memory 160 may store the touch pattern data and program or operation codes for processing the touch pattern data.

In accordance with an embodiment of the present invention, the touch pattern data may include at least one of a touch pattern field, an application information field, and a touch pattern input area field. The application information field may store information on an application or operation to be performed in response to the touch pattern. The touch pattern input area field may store information on an area or location where the touch pattern is made on an application screen of an application when the touch pattern data is set up in relation to the received touch pattern.

FIG. 3 illustrates a format of a touch pattern data, in accordance with an embodiment of the present invention.

Referring to FIG. 3, a touch pattern data may include a Field 1 for storing information on a touch pattern such as a shape of a touch pattern, a Field 2 for storing information on a main application to be performed in response to receiving the touch pattern, Field 3 through Field 5 for storing information on a touch pattern input area which is an area or location at which the touch pattern is made on an application screen of an application when the touch pattern data is set up, and Fields 6 and 7 for storing information related to functions or operations of a user equipment, which may be interactive with the application. For example, a user may draw a shape of "V" as a touch pattern on an application screen of a Google map application in order to store a touch pattern input area as a destination. In this case, the touch pattern Field 1 may store a touch pattern "V" and the application information Field 2 may store "com.google.map". The Fields 3 through 5 may store a latitude, a longitude, and an address, respectively. The Fields 6 and 7 may store a memo and an album respectively. However, the touch pattern data format illustrated in FIG. 3 has been given as an example only, and the present invention is not limited thereto. In accordance with an embodiment of the present invention, such set up touch pattern data may be stored in the memory 160.

In accordance with an embodiment of the present invention, a user may draw a touch pattern on a home screen or on an application screen of an executing application through a touch input unit after a touch pattern data of a specific touch pattern has been set up and stored. For example, a user may input a touch pattern of "V" on the touch screen of the display module 151. A user equipment may load a touch pattern data corresponding to the touch pattern of "V" and perform operations corresponding to the loaded touch pattern data. For example, the touch pattern processing module 182 of the controller 180 of the user equipment 100 may recognize the touch pattern of "V" and fetch a corresponding touch pattern data from the memory 160. The controller 180 may analyze information stored in the fetched touch pattern data. For example, the controller 180 may initiate a Google Maps application according to information stored in the main application information Field 2 of the touch pattern data. Also, the controller 180 may indicate a destination on an application screen for the Google map application to be displayed based on the longitude and the latitude stored in the touch pattern input area Fields 3 and 4. Furthermore, a user may be informed of a corresponding address and functions interactive with the Google map application based on information stored in the touch pattern data. The functions interactive with the Google map application may be a memo application and an album application.

As described above, the apparatus for performing operations of a user equipment using a touch pattern may provide a user interface that a user may conveniently and quickly execute and/or control programs, applications and/or processes of the user equipment by using a touch pattern previously stored in the user equipment. Hereinafter, a method for performing operation of a user equipment using a touch pattern, in accordance with an embodiment of the present invention, will be described with reference to FIG. 4.

Figure 4:
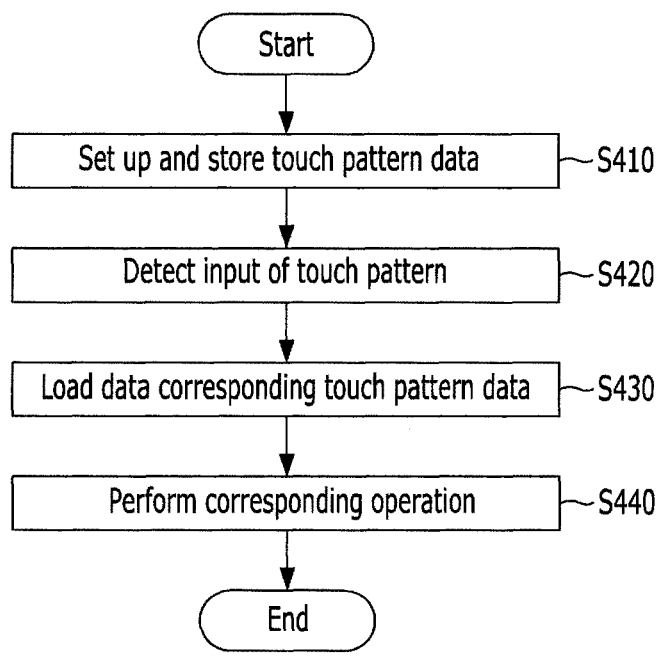
FIG. 4 illustrates a method for performing an operation of a user equipment by using a touch pattern, in accordance with an embodiment of the present invention.

FIG. 4 illustrates a method for performing an operation of a user equipment by using a touch pattern, in accordance with an embodiment of the present invention.

Referring to FIG. 4, a touch pattern data may be set up and stored S410.

For example, when a touch pattern is received from a user, a touch pattern data may be created. The created touch pattern data may include information on a main operation to be performed in response to the touch pattern, information on a touch pattern input area of an application screen, and/or information on functions interactive with the main application. The touch pattern data may have a format as illustrated in FIG. 3.

A touch pattern received as an input from a user may be detected 5420 when the user equipment 100 is displaying a home screen or an application screen of an executing application after the touch pattern data has been stored. For example, a user may input a touch pattern of "V" on a home screen in order to directly search for a stored destination of a google map application.

The user equipment may recognize a touch pattern inputted from a user and load a corresponding touch pattern data S430. For example, the touch pattern processing module 182 of the user equipment may recognize the touch pattern of "V" inputted through the touch screen of the display module 151 and retrieve a corresponding touch pattern data from the memory 160.

Operations of the user equipment may be performed based on the information stored in the touch pattern data S440. The operations of the user equipment may include initiating or running a main application in response to the touch pattern and also displaying the touch pattern input area according to a format as defined in the touch pattern data. The touch pattern input area may be displayed simultaneously with running or starting the main application. The touch pattern input area may be an area or location where a user may input or draw a corresponding touch pattern on an application screen of an application when the touch pattern data has been set up. For example, the controller 180 of the user equipment 100 may read information stored in the touch pattern data and initiate or run a Google map application based on the information stored in the main application information Field 2. Furthermore, the controller 180 may control a destination to be displayed on an application screen of the google map application based on information about the destination stored in the Fields 3 and 4, such as a longitude and a latitude. The controller 180 may inform a user of a destination address and functions or operations that are interactive with the Google map application, for example, a memo application and an album application.

As described above, a user may quickly and conveniently perform processes of the user equipment by using a touch pattern stored in a memory. Hereinafter, a method for setting up and storing a touch pattern data at a user equipment, in accordance with an embodiment of the present invention, will be described with reference to FIGS. 5 and 6.

Figure 5:
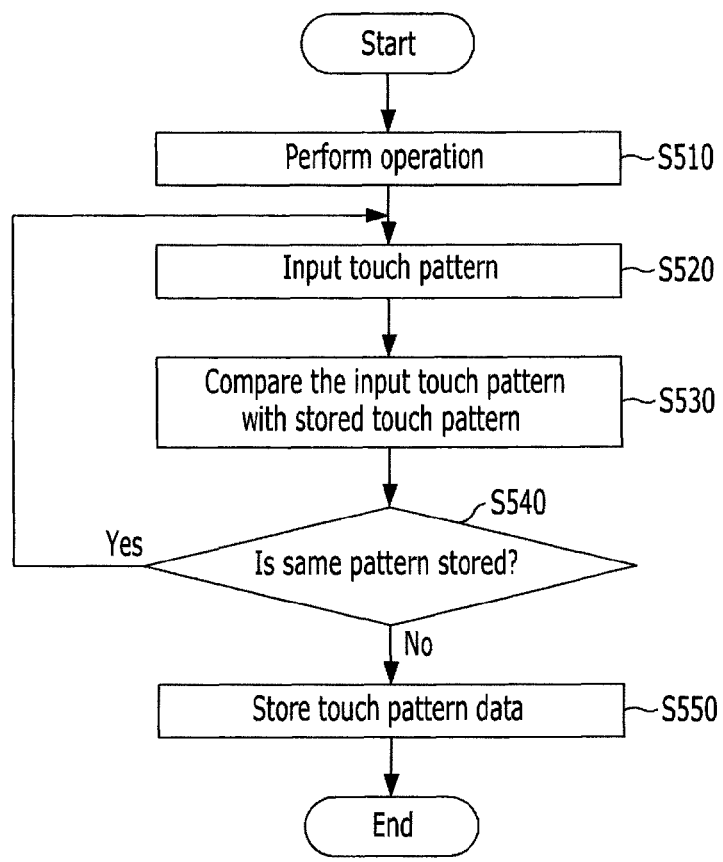
FIG. 5 illustrates a method for setting up and storing a touch pattern data when a touch pattern is input on an application screen of an application, in accordance with an embodiment of the present invention.
Figure 6:
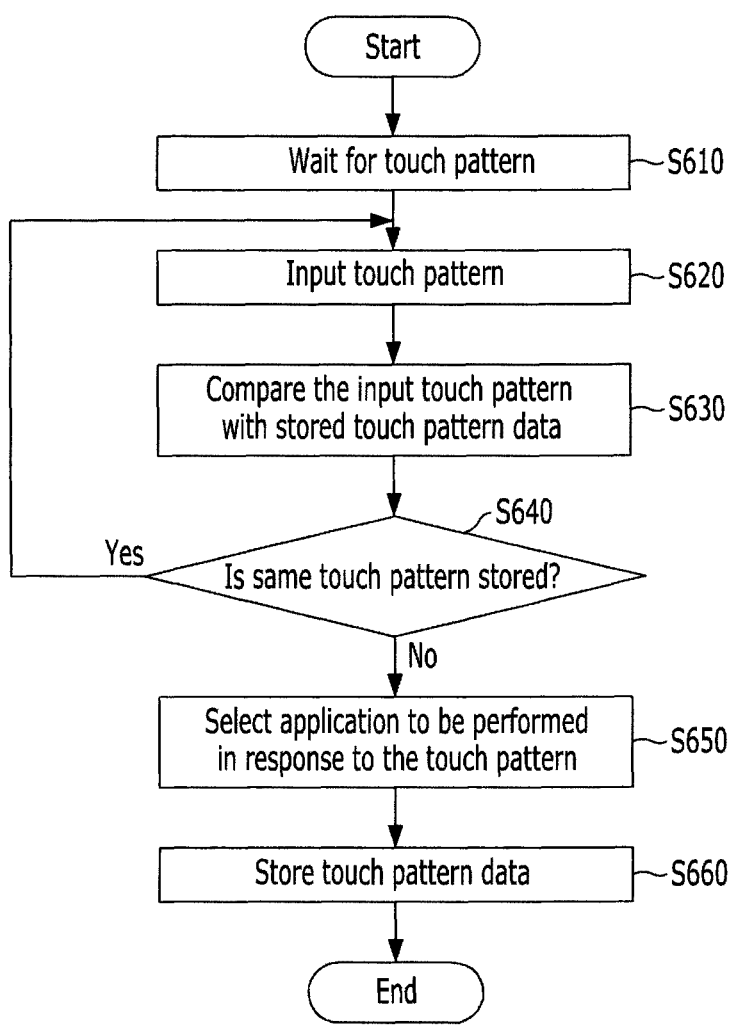
FIG. 6 illustrates a method for setting up and storing a touch pattern data when a touch pattern is input on a home screen, in accordance with an embodiment of the present invention.

FIG. 5 illustrates a method for setting up and storing a touch pattern data when a touch pattern is input on an application screen, in accordance with an embodiment of the present invention. FIG. 6 illustrates a method for setting up and storing a touch pattern data when a touch pattern is input on a home screen, in accordance with an embodiment of the present invention.

Referring to FIG. 5, a user equipment may perform an operation S10. For example, a user equipment may initiate or execute a Google map application. A user may input a touch pattern, such as by drawing, on an area of an application screen of the Google map application S520. For example, a user may draw a touch pattern of "V" at a location on the application screen of the Google map application.

The input touch pattern may be compared with touch patterns stored in a memory 160 S530. For example, the touch pattern processing module 182 of the user equipment 100 may recognize the drawn touch pattern of "V" and determine whether the same touch pattern is stored in the memory 160.

When the same touch pattern is not stored in the memory 160 (S540-NO), a corresponding touch pattern data may be stored S550. The touch pattern data may include information on the touch pattern, information on the application or operation, information on a touch pattern input area where the touch pattern is entered on an application screen of the application, and information on other functions or operations that are interactive with the application. For example, when a touch pattern matching the drawn touch pattern of "V" is not stored, the corresponding touch pattern data may be set up and stored. The corresponding touch pattern data may include information on the drawn touch pattern of "V", information on the Google map application, information on a latitude, a longitude, and an address of a touch pattern input area, and information on applications or operations interactive with the Google map application, such as a memo application and an album application. The touch pattern data may be stored in the memory 160 of the user equipment 100. Hereinafter, a method for setting up and storing a touch pattern data when a user inputs a touch pattern on a home screen, in accordance with an embodiment of the present invention, will be described with reference to FIG. 6.

Referring to FIG. 6, a user equipment may be in a waiting mode waiting for an input or event from a user S610. For example, the user equipment may display a home screen to wait for or while waiting for an input or event to be input from a user. A user may draw a desired touch pattern on a home screen S620. For example, a user may draw a touch pattern of "V" on the touch screen of the display module 151 of the user equipment 100.

The input touch pattern may be compared with stored touch pattern data stored in the memory 160 S630. For example, the touch pattern processing module 182 of the user equipment 100 may recognize the touch pattern of "V" input from the user and determine whether or not the same touch pattern is stored in the memory 160.

When the same touch pattern is not stored in the memory 160 (S640-NO), a user may be guided to select an operation or application to be performed in response to the drawn touch patter S650. For example, a user may select a Google map application to be executed. Then, a touch pattern data including information on the touch pattern and information on an operation or application to be executed in response to the touch pattern may be stored in the memory 160 S660.

After selecting an operation or application in accordance with an embodiment of the present invention, the selected operation or application may be performed and a touch pattern may be drawn at an area or location of an application screen of the selected application. In this case, the touch pattern data may include information on the touch pattern, information on the operation or application to be performed in response to the touch pattern, and information on a touch pattern input area. As described above, the touch pattern input area may be an area or location at which the touch pattern is drawn on the application screen of the application. The touch pattern data may further include information on functions or operations that are interactive with the application. For example, when a touch pattern data related to the touch pattern of "V" is not yet set up and stored, a touch pattern data may be set up to include information on the input touch pattern of "V", information on a Google map application, information on a latitude, a longitude, and an address of an area where the touch pattern of "V" is drawn on the application screen of the Google map application, and information on applications or operations that are interactive with the Google map application, such as a memo application and an album application. The touch pattern data may be stored in the memory 160. Hereinafter, an operation of a user equipment in accordance with an embodiment of the present invention will be described with reference to FIG. 7, wherein a touch pattern matching a stored touch pattern is input when the touch pattern data may be set up and stored.

Figure 7:
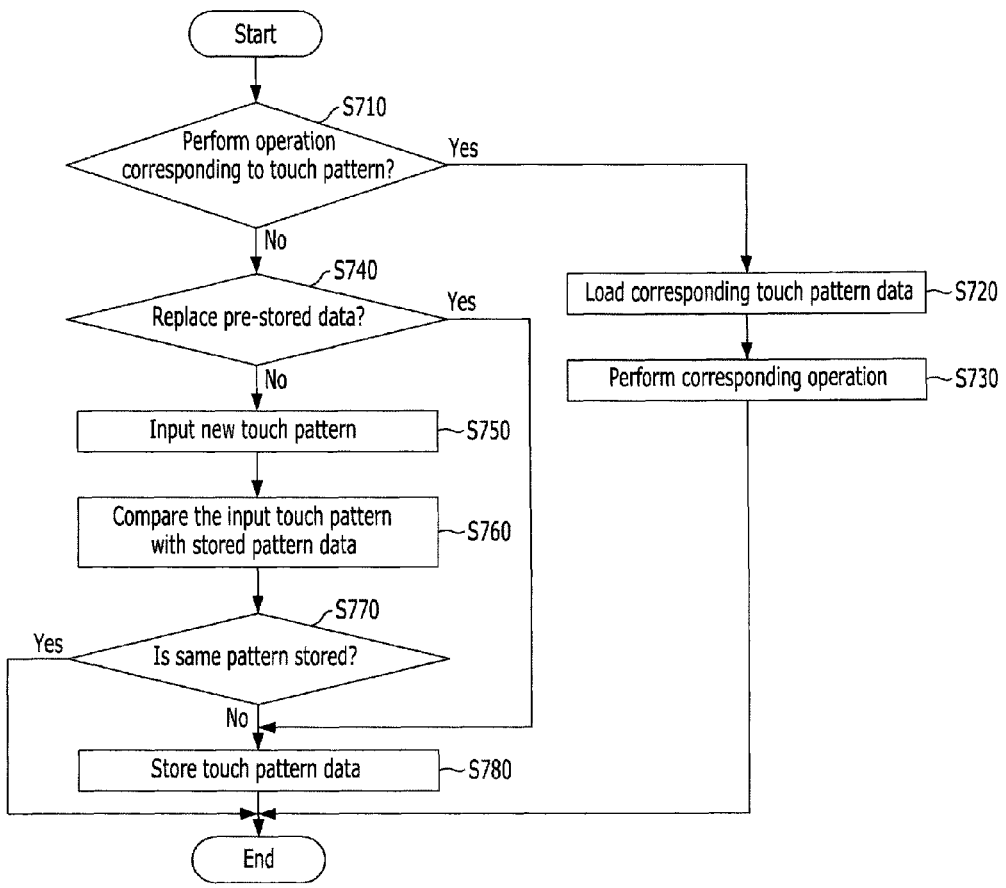
FIG. 7 illustrates a method for setting up and storing a touch pattern data when a user inputs a touch pattern identical to a stored touch pattern, in accordance with an embodiment of the present invention.

The operation of FIG. 7 may be performed when a touch pattern input from a user matches a touch pattern stored in a memory (S540-YES or S640-YES). For example, when a user inputs a touch pattern of "V", a touch pattern data corresponding to the input touch pattern of "V" may be stored. The touch pattern data may have a format as shown in FIG. 3.

Referring to FIG. 7, a user may select whether or not to perform an operation of a user equipment corresponding to the stored touch pattern S710. For example, a user equipment may inform the user that the touch pattern of "V" is already stored in a memory and query the user as to whether or not an application associated with the touch pattern of "V" is to be performed.

When the user wants to perform the operation corresponding to the touch pattern input from the user (S710-YES), a corresponding touch pattern data may be loaded S720. For example, the touch pattern processing module 182 of the user equipment 100 may recognize the touch pattern of "V" input through the touch screen of the display module 151, and a touch pattern data corresponding to the touch pattern of "V" is retrieved from the memory 160.

The operation of the user equipment 100 may be performed based on information included in the touch pattern data S730. For example, the controller 180 of the user equipment 100 may analyze the information included in the touch pattern data. Based on the analysis result, the controller 180 may execute a Google map application and display a destination on an application screen of the Google map application on the touch screen of the display module 151 based on the latitude, the altitude, and the address in the touch pattern input area information fields. Furthermore, the controller 180 may inform a user of a corresponding address and functions or operations that are interactive with the Google map application.

When the user does not want to perform the operation related to the touch pattern input from the user (S710-NO), the user may replace the previously-stored touch pattern data with a new touch pattern data S740. For example, the user equipment 100 may show the previously-stored touch pattern data corresponding to the touch pattern of "V" to the user and query the user to decide whether the previously-stored touch pattern data should be replaced with a new touch pattern data.

When the user wants to replace the previously-stored touch pattern data with the new touch pattern data (S740-YES), the new touch pattern data may be stored based on the currently input touch pattern S780. For example, a new touch pattern data may be created based on a touch pattern of "V" currently drawn on the touch screen of the display module 151. The new touch pattern data may include information on the touch pattern of "V", information on an application to be executed in response to the touch pattern of "V", information on a new touch pattern input area, information on whether the touch pattern is made on a corresponding application screen, and information on functions or operations that are interactive with the application.

When the user does not desire to replace the previously-stored touch pattern data (S740-NO), the user equipment 100 may guide a user to input a new touch pattern S750. Furthermore, the user equipment 100 may search for a touch pattern that matches the new touch pattern input by the user S760.

When it is determined that the same touch pattern is not stored in the memory 160 (S770-NO), a touch pattern data may be generated based on the new touch pattern and stored in the memory 160 S780. As described above, the touch pattern data may include information on the new touch pattern, information on the executing application, information on a touch pattern input area, information on whether the new touch pattern is made on an application screen of the executing application, and information on other functions or operations that are interactive with the executing application.

In accordance with an embodiment of the present invention, a user may be enabled to quickly and conveniently instruct the user equipment to perform operations by using a touch input whereby a touch pattern may be input as an instruction to the user equipment to instruct the performing of a corresponding operation. Touch pattern data stored in the user equipment allows the user equipment to perform a corresponding operation based on the touch input received from the user.

In accordance with embodiments of the present invention, the method for performing activities in a user equipment by using touch patterns may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for performing an operation on a user equipment, the method comprising:
pre-storing touch pattern data per initial touch pattern in a memory of the user equipment, wherein (i) the touch pattern data includes information on an operation to be performed per the initial touch pattern, and (ii) in a case that the pre-storing is performed through a map application, the touch pattern data further includes geographical data on a location where the initial touch pattern is input on a map application screen;
receiving a touch pattern through a touch input unit of the user equipment;
searching the memory of the user equipment for touch pattern data corresponding to the received touch pattern;
loading the touch pattern data corresponding to the received touch pattern from the memory; and
performing an operation that corresponds to the received touch pattern, based on the loaded touch pattern data,
wherein the performing includes performing the corresponding operation using corresponding geographical data when the loaded touch pattern data includes the corresponding geographical data.

2. The method of claim 1, wherein:
the touch pattern data comprises at least one of a touch pattern field for storing information on the initial touch pattern, an application information field for storing information on the operation to be performed in response to the initial touch pattern, and a touch pattern input area information field for storing information on a touch pattern input area of the initial touch pattern; and
the touch pattern input area information field comprises the geographical data on the location where the initial touch pattern is input on the map application screen.

3. The method of claim 2, wherein the touch pattern data further comprises a field for storing information on functions of the user equipment which are interactive with the operation to be performed in response to the initial touch pattern.

4. The method of claim 1, further comprising:
displaying a touch pattern input area where the touch pattern is input on an application screen associated with the operation.

5. The method of claim 1, wherein the pre-storing comprises:
receiving an initial touch pattern input on an application screen associated with an operation while executing the operation; and
storing into the memory, as the touch pattern data, information on the operation and information on a touch pattern input area of the operation,
wherein the touch pattern input area comprises an area of the touch input unit where the initial touch pattern is input on the application screen associated with the operation.

6. The method of claim 5, wherein the touch pattern data further comprises information on functions of the user equipment which are interactive with the operation.

7. The method of claim 5, wherein the pre-storing further comprises:
determining whether or not the received initial touch pattern matches a corresponding touch pattern data that is already stored in the memory; and
when the corresponding touch pattern data matching the received initial touch pattern is already stored in the memory, selectively performing one of replacing the stored touch pattern data corresponding to the received initial touch pattern with an updated touch pattern data and requesting an input of a different touch pattern as the initial touch pattern.

8. The method of claim 1, wherein the pre-storing comprises:
receiving an initial touch pattern input on a waiting screen;
requesting selection of the operation to be performed in response to receiving the touch pattern; and
storing into the memory information on the initial touch pattern and information on the selected operation.

9. The method of claim 8, wherein the touch pattern data comprises information on functions of the user equipment which are interactive with the operation to be performed.

10. The method of claim 8, wherein the pre-storing further comprises:
determining whether or not the received initial touch pattern matches a corresponding touch pattern data that is already stored in the memory; and
when the corresponding touch pattern data matching the received initial touch pattern is already stored in the memory, selectively performing one of replacing the stored touch pattern data corresponding to the received initial touch pattern with an updated touch pattern data and requesting an input of a different touch pattern as the initial touch pattern.

11. An apparatus for performing an operation, the apparatus comprising:
a touch input unit configured to receive a touch pattern as an input;
a controller configured to create touch pattern data per initial touch pattern by performing a touch pattern pre-storage procedure, enable the touch input unit to receive the touch pattern, initiate a search for touch pattern data corresponding to the received touch pattern, initiate a loading of the corresponding touch pattern data, and initiate performance of an operation that corresponds to the received touch pattern, based on the loaded touch pattern data; and
a memory configured to pre-store the touch pattern data per the initial touch pattern created through the touch pattern pre-storage procedure, and from which the touch pattern data is searched for and loaded,
wherein the created touch pattern data includes information on an operation to be performed per the initial touch pattern;
wherein in a case that the touch pattern pre-storage procedure is performed through a map application, the created touch pattern data further comprises geographical data on a location where the initial touch pattern is input on a map application screen;
wherein the controller is configured to initiate the performance of the operation according to the received touch pattern, using corresponding geographical data when the loaded touch pattern data includes the corresponding geographical data.

12. The apparatus of claim 11, wherein:
the created touch pattern data comprises at least one of a touch pattern field for storing information on the initial touch pattern, an application information field for storing information on the operation to be performed in response to the initial touch pattern, and a touch pattern input area information field for storing information on a touch pattern input area of the initial touch pattern; and
the touch pattern input area information field comprises the geographical data on the location where the initial touch pattern is input on the map application screen.

13. The apparatus of claim 12, wherein the created touch pattern data further comprises a field for storing information on functions which are interactive with the operation to be performed in response to the initial touch pattern.

14. The apparatus of claim 11, wherein:
a touch pattern input area is displayed on a display module configured with the touch input unit; and
the touch pattern input area is an area where the touch pattern is input on an application screen associated with the operation.

15. The apparatus of claim 11, wherein:
the controller is configured to enable the touch input unit to receive an initial touch pattern input on an application screen associated with an operation while executing the operation, and enable the memory to store, as the touch pattern data, information on the operation and information on a touch pattern input area of the operation; and
the touch pattern input area comprises an area of the touch input unit where the initial touch pattern is input on the application screen associated with the operation.

16. The apparatus of claim 15, wherein the created touch pattern data further comprises a field for storing information on functions of the user equipment which are interactive with the operation.

17. The apparatus of claim 15, wherein a determination is made as to whether or not the received initial touch pattern matches a corresponding touch pattern data that is already stored in the memory; and
when the corresponding touch pattern data matching the received initial touch pattern is already stored in the memory, selectively performing one of replacing the stored touch pattern data corresponding to the received initial touch pattern with an updated touch pattern data and requesting an input of a different touch pattern as the initial touch pattern.

18. The apparatus of claim 11, wherein:
the controller is configured to enable the touch input unit to receive an initial touch pattern input on a waiting screen, a selection of the operation to be requested in response to receiving the initial touch pattern, and the memory to store information on the initial touch pattern and information on the selected operation.

19. The apparatus of claim 11, wherein the touch input unit comprises a touch screen.

20. A non-transitory computer-readable storage medium storing a program for performing an operation on a user equipment having a processor, the program which when executed by the processor performs a method, the method comprising:
pre-storing touch pattern data per initial touch pattern in a memory of the user equipment, wherein (i) the touch pattern data includes information on an operation to be performed per the initial touch pattern, and (ii) in a case that the pre-storing is performed through a map application, the touch pattern data further includes geographical data on a location where the initial touch pattern is input on a map application screen;
receiving a touch pattern through a touch input unit of the user equipment;
searching the memory of the user equipment for touch pattern data corresponding to the received touch pattern;
loading the touch pattern data corresponding to the received touch pattern from the memory; and
performing an operation of the user equipment that corresponds to the received touch pattern, based on the loaded touch pattern data,
wherein the performing includes performing the corresponding operation using corresponding geographical data when the loaded touch pattern data includes the corresponding geographical data.

* * * * *